United States Patent
Claesson et al.

(10) Patent No.: US 6,925,915 B1
(45) Date of Patent: Aug. 9, 2005

(54) METHOD AND DEVICE FOR CONTROLLING A TURNING OPERATION

(75) Inventors: Ingvar Claesson, Dalby (SE); Thomas Lago, Provo, UT (US); Lars Hakansson, Helsingborg (SE)

(73) Assignee: Staffansboda Compagnie AB, Forsheda (SE)

( * ) Notice: Subject to any disclaimer, the term of this patent is extended or adjusted under 35 U.S.C. 154(b) by 0 days.

(21) Appl. No.: 09/807,916

(22) PCT Filed: Oct. 19, 1999

(86) PCT No.: PCT/SE99/01884

§ 371 (c)(1),
(2), (4) Date: Nov. 21, 2001

(87) PCT Pub. No.: WO00/25963

PCT Pub. Date: May 11, 2000

(30) Foreign Application Priority Data

Oct. 22, 1998 (SE) .................................. 9803606

(51) Int. Cl.⁷ ............................ B23B 7/00; B23B 25/06
(52) U.S. Cl. ......................................... 82/133; 82/904
(58) Field of Search .................. 82/133, 134; 408/129, 408/131

(56) References Cited

U.S. PATENT DOCUMENTS

| 4,849,668 A | * | 7/1989 | Crawley et al. | 310/328 |
| 5,170,103 A | * | 12/1992 | Rouch et al. | 318/128 |
| 5,315,203 A | * | 5/1994 | Bicos | 310/326 |
| 5,558,477 A | * | 9/1996 | Browning et al. | 408/143 |

FOREIGN PATENT DOCUMENTS

JP    A63180401    7/1988

* cited by examiner

*Primary Examiner*—Willmon Fridie, Jr.
(74) *Attorney, Agent, or Firm*—Birch, Stewart, Kolasch & Birch, LLP

(57) ABSTRACT

A device increases the surface smoothness of a turned surface. The device comprising a control system with a control unit and an actuator connectible to the control unit and connectible with a tool holder. The actuator in adapted to impart a vibrating motion in the lateral direction to the tool holder. A method will also increase the surface smoothness of a turned surface, comprising the step of controlling the vibrations of the tool holder during turning. The method also comprises the step of imparting a vibrating motion in the lateral direction to the tool holder. Moreover, a turning lathe and a turning tool holder which like the device are designed to generate vibrating motion in the lateral direction.

13 Claims, 2 Drawing Sheets

METHOD AND DEVICE FOR CONTROLLING A TURNING OPERATION

This application is the national phase under 35 U.S.C. § 371 of PCT International Application No. PCT/SE99/01884 which has an International filing date of Oct. 19, 1999, which designated the United States of America and was published in English.

FIELD OF THE INVENTION

The present invention relates to a method and a device for controlling a turning operation, more specifically a method, a device, a turning tool holder and a turning lathe for increasing the surface smoothness of a turned surface.

BACKGROUND ART

When a workpiece is worked by means of a lathe, a certain degree of unevenness always arises in the turned surface. The unevenness can be resembled to stripes or threads and arises owing to the cutting edge of the working tool having a limited nose radius. The tools are manufactured with a plurality of different standard radii. The radius of the cutting edge results, in combination with the feeding, in a surface which is not quite smooth. A low feeding speed certainly gives a smoother surface but is irrational in industrial manufacture and therefore does not solve the problem.

For reasons of rationality and expense, much would be gained if, in spite of a relatively high feeding speed, it would be possible to obtain a surface having such a high smoothness that the finishing which today is often necessary can be eliminated or, in any case, be significantly reduced.

SUMMARY OF THE INVENTION

An object of the present invention is to provide a method and a device for increasing the surface smoothness in turning.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention and further advantages thereof will now be described in more detail by way of embodiments which reference to the accompanying drawings which are given by way of illustration only, and thus are not limitative of the present invention, and in which.

DESCRIPTION OF AN EMBODIMENT

Figure 1:
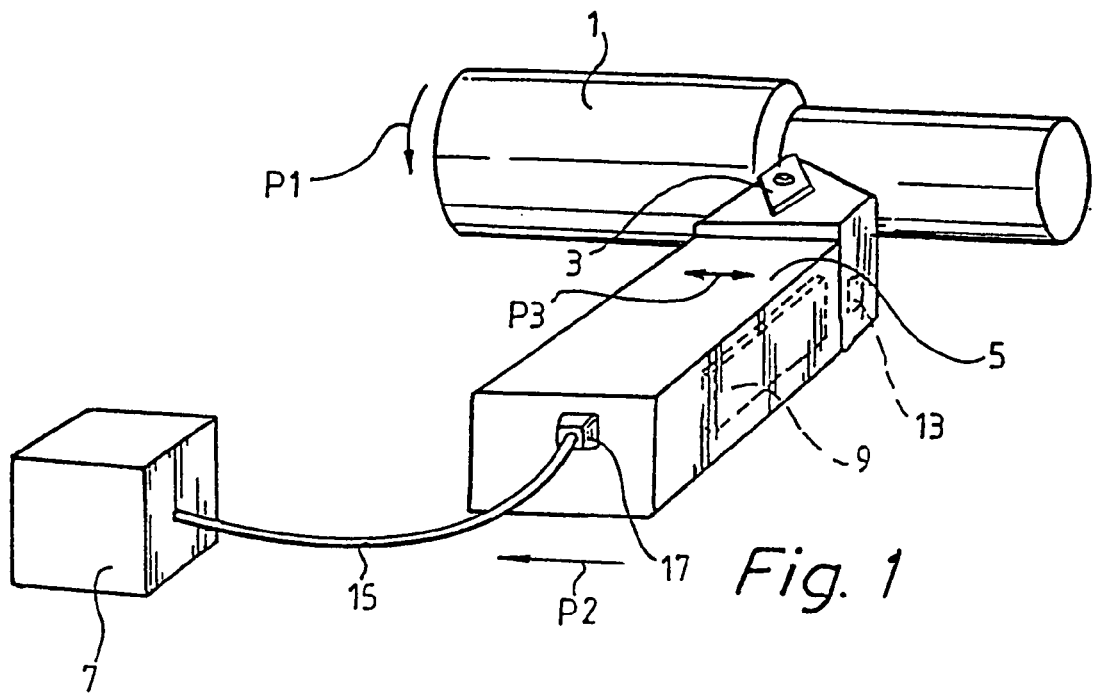
FIG. 1 is a schematic perspective view of an embodiment of the inventive device.
Figure 2:
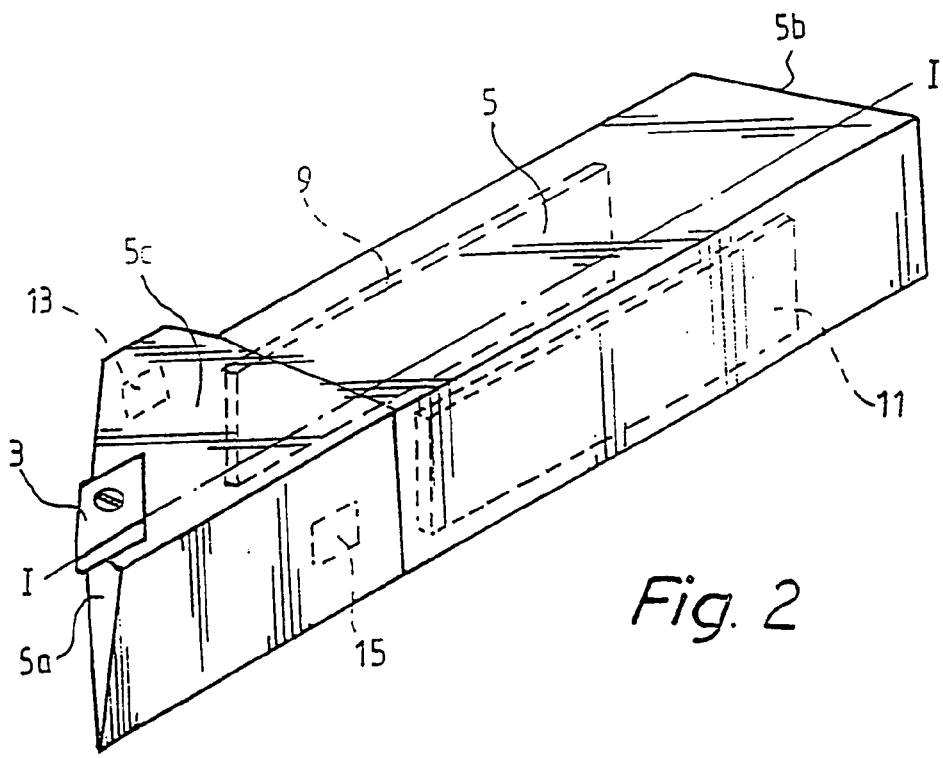
FIG. 2 is a schematic view of an embodiment of a tool holder according to the invention.

FIG. 1 illustrates essentially an embodiment of the device and also of the tool holder according to the invention. Reference numeral 1 indicates a workpiece which is arranged in a lathe and rotates in the direction indicated by arrow P1. The workpiece 1 is worked by means of a tool 3, here referred to as insert, which is rigidly connected to a tool holder 5, here referred to as insert holder. The device comprises a control system with a control unit 7 and two actuators 9, 11, one of which is indicated by dashed lines in FIG. 1 and both of which are shown in FIG. 2, which illustrates the actual tool holder 5 in a different view.

Each actuator 9, 11 comprises an active element 9, 11, which here is a piezoceramic element. A piezoceramic element can in turn be designed as a unit or advantageously be made up as a so-called stack and/or of several partial elements. Thus the element can be a solid body or a plurality of individual, but composed and interacting bodies. The active elements 9, 11 are embedded in the body of the tool holder 5, which is also referred to as shaft. More specifically, they are fixed by casting. The casting is carried out by forming for each active element 9, 11 a recess in the body of the tool holder, whereupon the active element 9, 11 is placed therein and covered by casting. The active element 25, 27 is glued preferably to the bottom surface of the recess. The active elements 9, 11 are embedded fairly close to the surface of the tool holder 5, i.e. close to its lateral surfaces 5d, 5e. Moreover, the active elements 9, 11 are plate-shaped and are oppositely arranged in parallel. The active elements 9, 11 are arranged on each side of the centre axis of the tool holder 5, said centre axis being designated I—I in FIG. 2. An active element 9, 11 is characterised in that it changes dimension when an electric voltage is applied across the same. The dimensional change is related to the voltage. Moreover, the tool 3 is mounted on the upper side 5c of the holder 5.

Figure 3:
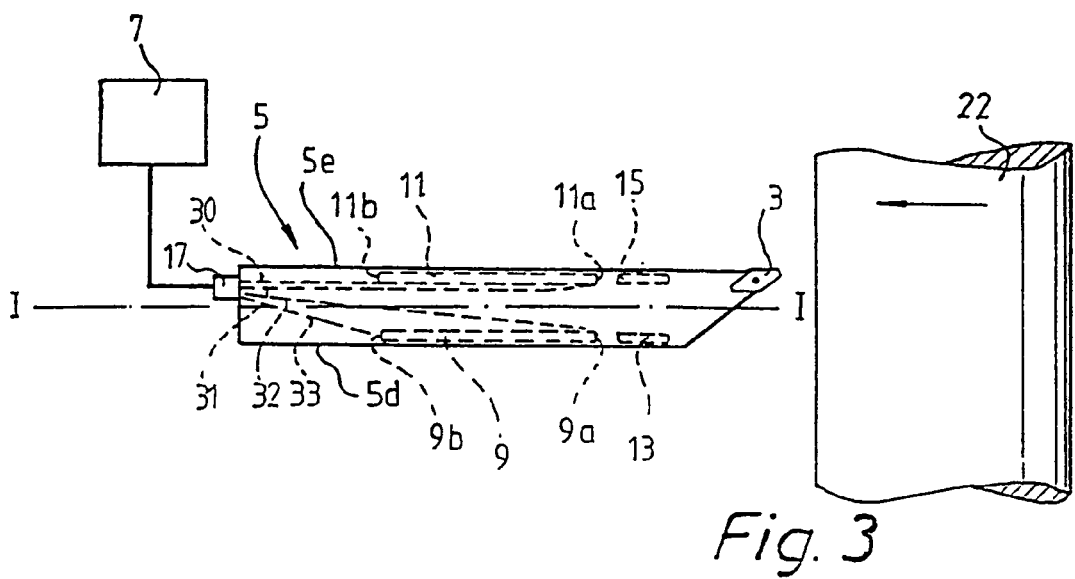
FIG. 3 is a schematic plan view of the device in FIG. 1.

The control unit 7 is via a conduit 15 and a terminal 17 connected to the tool holder 5. Inside, i.e. embedded in, the tool holder 5 extend to/from the terminal 17 conductors 30–33 of the active elements, or the piezoceramic elements 9, 11, see FIG. 3. The piezoceramic elements 9, 11 are elongate in the longitudinal direction of the tool holder 5, and the conductors 30–33, which are connected in pairs to a piezoceramic element 9, 11 each, are connected to the front ends 11a, 9a and rear ends 11b, 9b thereof.

The device operates as follows. The tool 3 and the tool holder 5 are fed in the direction of arrow P2 at a certain feeding speed M. The workpiece rotates in the direction of arrow P1 at a certain cutting speed. The combination of M>O, and the edge of the tool 3 having a radius causes remaining, helically extending ridges on the worked surface. More than anything, the ridges resemble stripes. The control unit 7 feeds control voltages to the actuators, more specifically to the piezoceramic elements 9, 11. When voltage is applied to the piezoceramic elements 9, 11, they are thus extended to a greater or smaller degree depending on the amplitudes of the voltages. In other words, each piezoceramic element 9, 11 obtains a dimensional change in its longitudinal direction, which also is the longitudinal direction of the tool holder 5. The piezoceramic elements 9, 11 are preferably embedded in the tool holder 5 so that their boundary surfaces abut directly against the material of the body of the tool holder 5. The piezoceramic elements 9, 11 have opposite power-transmitting surfaces in the form of their end faces at the ends 9a, 9b, 11a and 11b. The end faces transfer the longitudinal changes of the piezoceramic elements 9, 11 in the body of the tool holder 5. Since the piezoceramic elements 9, 11 are spaced from the centre axis I—I of the tool holder 5, the longitudinal changes generate turning moments which in the illustrated arrangement of the piezoceramic elements 9, 11 show themselves as bending.

By the expression "spaced from the centre axis" is meant that the centre axes of the piezoceramic elements 9, 11 do not coincide with the centre axis of the tool holder 5. If the centre axes should coincide, no bending moment would be obtained, but merely a pure longitudinal change of the tool holder 5. The same would apply if the two piezoceramic elements 9, 11 should be longitudinally changed concurrently and to the same extent. The forces induced by means of the piezoceramic elements 9, 11 bend the front end 5a of the tool holder 5 in the lateral direction, from side to side, thanks to the control voltages to the respective piezoceramic elements 9, 11 being applied so that the piezoceramic elements 9, 11 are longitudinally changed in opposition to each other. Thus the tool holder 5 is made to move in a vibrating manner alternatingly in and against the direction of feed.

The turning moments thus act about an axis which is perpendicular to the centre axis I—I and produce a vibrating motion in the lateral direction, as indicated by arrow P3. By the lateral vibrations, the groove which the tool forms in the surface of the workpiece 1 is widened and the stripes are worked off. The appearance of the control voltages, however, is important to the result. In a preferred embodiment of the device, the control unit 7 generates composite control voltages having a wide, noise-like frequency content. A factor in this context, however, is the feeding speed M which may vary quite considerably between different turning operations. The feeding speed is above all important to the amplitude of the control voltages. A preferred embodiment of the inventive device therefore comprises a control unit which is adjustable in respect of the amplitude of the control voltages. As a result, different amplitudes can be generated.

Alternative Embodiments

The above specification essentially constitutes a non-limiting example of how the device according to the invention can be designed. Many modifications are possible within the scope of the invention as defined in the appended claims. Below follow some examples of such modifications.

In an alternative embodiment, the control unit also comprises a means for adjusting the frequency content of the control voltages.

In a further alternative embodiment, the control unit has preset values of frequency and amplitude of the control voltages.

In one more alternative embodiment of the inventive device, the control unit 7 operates with fed-back control, which means that it strives to set the amplitude of the vibrations at a suitable level by means of feed-back from sensors. The control unit 7 can be selected among many different types, such as analog fed-back control unit, conventional PID regulator, adaptive regulator or some other suitable type of control unit. To achieve said fed-back control, the sensors 13, 15 are arranged in the tool holder 5 as illustrated in the Figures. The sensors 13, 15 are arranged in front of the actuators 9, 11. By "in front of" is meant closer to the end of the tool holder 5 where the tool 3 is mounted, said end being naturally considered the front end 5a of the tool holder 5. The opposite end 5b thus is the rear end of the tool holder 5. The sensors 13, 15 consist of piezoelectric crystals which generate an electric voltage when subjected to forces. The sensors 13, 15 are preferably, like the actuators 9, 11, embedded in the body of the tool holder 5 and are electrically connected with the control unit 7 via conductors which are connected in the same way as the conductors 30–33 of the actuators, but which for reasons of clarity are not shown.

The sensors 13, 15 are subjected to alternating pulling and pressing forces. Each sensor 13, 15 then generates a sensor voltage which varies concurrently with the variations in force. The sensor voltages are detected and analysed by the control unit 7, which controls the actuators 9, 11 in accordance with the desired amplitude of the sensor voltages. The regulation which this involves is carried out by means of a control algorithm. A large number of known control algorithms are available.

In one more alternative embodiment of the device according to the invention, the control unit takes the present feeding speed into consideration, i.e. the control unit has a means for indicating which feeding speed is appropriate for the turning operation which is to begin. In an NC-controlled lathe, the means can even automatically collect this information directly from the NC control system.

A further possible modification is to change the number of actuators. In the simplest case, one actuator is arranged in the tool holder. To achieve a more symmetric application of forces on the tool holder, it is however advantageous to arrange at least the above-described pair of actuators in the described opposite arrangement. There is nothing to prevent that a larger number of actuators are arranged which are oppositely arranged in pairs in the tool holder. For practical reasons and in view of the production costs, it is however disadvantageous to embed a large number of actuators.

The method of mounting the active elements may be varied. In addition to the above-mentioned way of mounting, they can be, for example, premounted in a mould in which the tool holder is cast. If they are fixed by casting later, as has been described above, they can either be covered with the same material as that of which the tool holder is made or with some other convenient material. Moreover it is possible to use alternatives to the above-described, preferred mounting, where the elements are certainly glued to the base of the recess but two opposite power-transmitting surfaces essentially generate the turning moments. Such an alternative means that the dimensional change is completely transferred via the glue joint, which in principle is possible with today's strongest adhesives. In that case, the abutment of the above-mentioned power-transmitting surfaces can be omitted, which reduces the claims for adaptation. Also other variants are contained within the scope of the invention.

The active elements are in respect of form not bound to be rectangularly parallelepipedal and plate-shaped as the shown elements, but the form may vary. The plate shape, however, is advantageous since it contributes to minimising the volume of the element. Moreover, an elongate form is an excellent property which also contributes to imparting to the element a small volume. It is preferred that the dimensional changes occur in the longitudinal direction of the element.

Basically, other types of actuators and ways of mounting than those described above are contained within the scope of the invention. However, embedded, active elements have obvious advantages.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for increasing surface smoothness of a turned surface, the device comprising a control system comprising a control unit and an actuator connectible to the control unit and connectible with a tool holder, the actuator being adapted to impart a vibrating motion in a lateral direction to the tool holder wherein the tool holder moves in a vibrating manner alternatingly in and against a direction of feed when the device is mounted in a turning lathe, the actuator being spaced from a center, longitudinal axis of the tool holder, wherein the actuator is at least one piezoceramic element which is movable in a direction parallel to the center, longitudinal axis of the tool holder in order to create side-to-side vibration motion in the tool holder.

2. The device as claimed in claim 1, wherein the actuator comprises an active element which is embeddable in a body of the tool holder.

3. The device as claimed in claim 1 or 2, wherein the control system comprises a vibration sensor connectible to the control unit and connectible with the tool holder, the vibration sensor detecting vibrations of the tool holder in the lateral direction, and the control unit controlling vibrating motion by controlling the actuator according to sensor signals from the vibration sensor.

4. A turning tool holder comprising an actuator for imparting a vibrating motion in a lateral direction to the turning tool holder, the turning tool holder being moved in a vibrating manner alternatingly in and against a direction of feed when the tool holder is mounted in a turning lathe, the actuator being spaced from the center longitudinal axis of the tool holder, wherein the actuator is at least one piezoceramic element which is movable in a direction parallel to the center, longitudinal axis of the tool holder in order to create side-to-side vibration motion in the tool holder.

5. The turning tool holder as claimed in claim 4, wherein the actuator comprises an active element embedded in a body of the turning tool holder.

6. The turning tool holder as claimed in claim claim 4 or 5, wherein the actuator comprises at least one pair of active elements, the active elements included in the pair being oppositely arranged on each side of the center, longitudinal axis of the tool holder.

7. The turning tool holder as claimed in claim 4, further comprising a vibration sensor embedded in a body of the turning tool holder.

8. A turning lathe comprising a tool holder and an actuator connected with the tool holder, the actuator imparting a vibrating motion in a lateral direction to the tool holder in order to make the tool holder move in a vibrating manner alternatingly in and against a direction of feed, the actuator being spaced from a center, longitudinal axis of the tool holder, wherein the active element is a piezoceramic element which is movable in a direction parallel to the center, longitudinal axis of the tool holder in order to create side-to-side vibration motion in the tool holder.

9. The turning lathe as claimed in claim 8, further comprising a control system, the control system comprises a control unit and a vibration sensor connected to the control unit and connected with the tool holder, the actuator being connected to the control unit, the vibration sensor detects vibrations of the tool holder in the lateral direction, the control unit controlling vibrating motion by controlling the actuator according to sensor signals from the vibration sensor.

10. The turning lathe as claimed in claim 8 or 9, wherein the actuator comprises an active element which is embedded in a body of the tool holder.

11. A method for increasing surface smoothness of a turned surface, comprising the steps of:
controlling vibrations of a tool holder during turning,
imparting a vibrating motion in a lateral direction to the tool holder in order to make the tool holder move in a vibrating manner alternatingly in and against a direction of feed, and
providing an actuator in the tool holder, the actuator being spaced from a center, longitudinal axis of the tool holder and causing the vibrating motion,
further comprising the steps of using a piezoceramic element as the actuator and moving the actuator in a direction parallel to the center, longitudinal axis of the tool holder.

12. The method as claimed in claim 11, further comprising the step of controlling in a feed-back manner the vibrating motion by detecting lateral vibration of the tool holder and controlling the actuator according to the lateral vibration.

13. The method as claimed in claim 11, further comprising the step of adjusting the vibrating motion in response to feeding speed.

\* \* \* \* \*